(12) United States Patent
Tamura

(10) Patent No.: US 7,344,253 B2
(45) Date of Patent: Mar. 18, 2008

(54) PROJECTOR AND METHOD OF PROJECTING IMAGE FROM PROJECTOR

(75) Inventor: Youichi Tamura, Minato-ku (JP)

(73) Assignee: NEC Display Solutions, Ltd., Tokyo (JP)

( * ) Notice: Subject to any disclaimer, the term of this patent is extended or adjusted under 35 U.S.C. 154(b) by 92 days.

(21) Appl. No.: 10/957,626

(22) Filed: Oct. 5, 2004

(65) Prior Publication Data

US 2005/0073661 A1    Apr. 7, 2005

(30) Foreign Application Priority Data

Oct. 6, 2003   (JP) .............................. 2003-346948

(51) Int. Cl.
*G03B 21/14* (2006.01)

(52) U.S. Cl. .......................... 353/69; 353/70

(58) Field of Classification Search ................ 353/69, 353/70, 122
See application file for complete search history.

(56) References Cited

U.S. PATENT DOCUMENTS

| | | | | |
|---|---|---|---|---|
| 5,752,758 A * | 5/1998 | Woo | .............................. | 353/69 |
| 5,795,046 A * | 8/1998 | Woo | .............................. | 353/69 |
| 6,511,185 B1 * | 1/2003 | Gananathan | .................. | 353/69 |
| 6,846,081 B2 * | 1/2005 | Mochizuki et al. | ........... | 353/70 |
| 6,974,217 B2 * | 12/2005 | Kimura et al. | ................ | 353/69 |
| 2003/0223048 A1 * | 12/2003 | Kimura | ........................ | 353/70 |

FOREIGN PATENT DOCUMENTS

| JP | 8-289237 A | 11/1996 |
|---|---|---|
| JP | 09-90891 A | 4/1997 |
| JP | 9-191441 A | 7/1997 |
| JP | 2001-249401 A | 9/2001 |
| JP | 2001-339671 A | 12/2001 |
| JP | 2002-135690 A | 5/2002 |
| JP | 3092698 U | 12/2002 |
| JP | 2003-198993 A | 7/2003 |
| JP | 2003-198995 A | 7/2003 |
| JP | 2003-280089 A | 10/2003 |
| JP | 2003-283963 A | 10/2003 |

* cited by examiner

*Primary Examiner*—William C. Dowling
(74) *Attorney, Agent, or Firm*—Sughrue Mion, PLLC

(57) ABSTRACT

A projector has an acceleration sensor for detecting a tilt angle of the projector, a manual controller for manually setting a correction amount for a keystone distortion correction, an auto/manual switch, an upper edge basis corrector for determining parameters for an upper edge basis keystone distortion correction, a lower edge basis corrector for determining parameters for a lower edge basis keystone distortion correction, and an image processor for performing a keystone distortion correction on the image on the basis of the upper edge or lower edge in accordance with parameters applied thereto from the upper edge basis corrector or lower edge basis corrector to display the corrected image on a liquid crystal panel or the like. As the auto/manual switch selects an automatic adjustment, the acceleration sensor and upper edge basis corrector are connected to the image processor. As a manual adjustment is selected, the manual controller and lower edge basis corrector are connected to the image processor.

9 Claims, 5 Drawing Sheets

PRIOR ART

PRIOR ART

PRIOR ART

PRIOR ART

PROJECTOR AND METHOD OF PROJECTING IMAGE FROM PROJECTOR

BACKGROUND OF THE INVENTION

1. Field of the Invention

The present invention relates to a projector and a method of projecting an image from the projector, and more particularly, to a projector which corrects an image projected obliquely upward toward a vertical screen for a resulting keystone distortion, and a method of projecting an image from the projector.

2. Description of the Related Art

A projector projects an image displayed on a liquid crystal panel or the like onto a screen through a projection lens. When the optical axis of the projection lens is perpendicular to the screen, the image on the liquid crystal panel is enlarged and projected onto the screen without distortion. However, when the optical axis of the projection lens inclines with respect to the screen, a projected image will suffer from a keystone distortion. Therefore, a keystone distortion correction is required for correcting the image on the liquid crystal panel before the image is displayed. Recent projectors generally have such a keystone distortion correcting function.

A conventional keystone distortion correcting method is disclosed, for example, in Japanese Patent Laid-open Publication No. 249401/2001.

When a rectangular image on a liquid crystal panel is projected onto an upright screen obliquely upward from a projector, i.e., with the optical axis of a projection lens oriented obliquely upward, image 11 of an upward diverging trapezoid is projected onto screen 10, as illustrated in FIG. 1.

Assume that longer edge 13, which is the upper edge of image 11, is longer than shorter edge 12, which is the lower edge of image 11, by a length of K on both sides (the longer edge and shorter edge refer to two parallel longer and shorter edges of a trapezoid except for oblique edges). In this scenario, image 11 is corrected for the keystone distortion by correcting the image displayed on the liquid crystal panel. As a result, an image of a rectangle is displayed on screen 10, as illustrated in FIG. 2, with upper edge 13 being cut away by K on both sides thereof.

The keystone distortion correction disclosed in Japanese Patent Laid-open Publication No. 249401/2001 fixes the lower edge of an image for the correction, whereas another keystone distortion correction is made with the upper edge of an image being fixed. The keystone distortion correction which involves fixing the lower edge facilitates adjustments. On the other hand, the keystone distortion correction which involves fixing the upper edge can take a larger projection angle (an angle of a line which connects the intersection of diagonals of an image on the screen to a projector with respect to a horizontal plane after adjusted), and can readily display an image at a higher position on the screen. Determination on either of the keystone distortion corrections to employ depends on manufacturers and types of projectors.

FIGS. 3A to 3C show changes in an image on a liquid crystal panel resulting from the keystone distortion correction which is made with the lower edge being fixed, when the image is projected onto an upright screen from a projector which is installed obliquely upward to the screen.

Image 15 on the liquid crystal panel before the keystone distortion correction appears as a rectangle, as illustrated in FIG. 3A. FIG. 3B illustrates image 16 on the liquid crystal panel when image 15 undergoes the keystone distortion correction (image 15 is superimposed on image 16. This applies as well to FIGS. 3C and 5A to 5C), and FIG. 3C illustrates image 17 on the liquid crystal panel when a larger amount of correction is applied. Since a projected image which is distorted into a trapezoid is made wider in the upper edge and longer in the vertical direction, the corrected image has the upper edge reduced in width and the upper edge brought downward, while the lower edge remains at a fixed position.

FIG. 4 shows changes in an image on a screen resulting from a lower edge basis keystone distortion correction, which is made with the lower edge being fixed, when the image is projected onto such an upright screen from a projector which is installed obliquely upward to the screen. Image 13 which suffers from a keystone distortion before the correction is corrected into image 20 by a certain degree of the keystone distortion correction, and rectangular image 21 is reached by adjusting image 13 with a larger amount of correction. The keystone distortion correction causes the image to shift downward, so that when image 13 is first expanded over the entire displayable area of the screen, image 21 corrected for the keystone distortion appears in a lower portion of the displayable area.

With the lower edge basis keystone distortion correction, an adjustment does not cause any change in the position and width of the lower edge of an image. Therefore, an user may first bring the lower edge of an image to a target position and set the width of the image to a target width before the keystone distortion correction is made, to readily produce a normal rectangle with the lower edge located at the target position and having the target width.

However, although a projector is inherently inclined upward for projection in order to display an image at a higher position, the lower edge basis keystone distortion correction results in an image which is displayed in a lower portion of a displayable area on the screen. Thus, the lower edge basis keystone distortion correction is disadvantageous over an upper edge basis keystone distortion correction, described below, in that images are displayed only at low positions.

FIGS. 5A to 5C show changes in an image on a liquid crystal panel, resulting from the keystone distortion correction which is made with the upper edge being fixed, when the image is projected onto an upright screen from a projector which is installed obliquely upward to the screen.

Image 15 on the liquid crystal panel before the keystone distortion correction appears as a rectangle, as illustrated in FIG. 5A. FIG. 5B illustrates image 18 on the liquid crystal panel when image 15 undergoes the keystone distortion correction, and FIG. 5C illustrates image 19 on the liquid crystal panel when a larger amount of correction is applied. While the width of the upper edge is narrowed and the lower edge is brought upward, the upper edge remains at a fixed position.

FIG. 6 shows changes in the image on the screen resulting from the upper edge basis keystone distortion correction, which is made with the upper edge being fixed, when the image is projected onto such an upright screen from a projector which is installed obliquely upward to the screen. Image 13 which suffers from a keystone distortion before the correction is corrected into image 22 by a certain degree of the keystone distortion correction, and rectangular image 23 is reached by adjusting image 13 with a larger amount of correction. The keystone distortion correction causes the image to shift upward, so that when image 13 is first expanded over the entire displayable area of the screen, image 23 corrected for the keystone distortion appears in an upper portion of the displayable area. In other words, a larger projection angle is ensured.

The upper edge basis keystone distortion correction causes a change in the position of the lower edge of an image and in the width of the upper edge of the image depending on the amount of adjustment. Therefore, when an user sets the lower edge of the image at a target position, the user must again set the position of the lower edge each time the keystone distortion correction is made. On the other hand, when the user sets the upper edge of the image at a target position and width, the user must alternately set the width of upper edge of the image by adjusting a zoom lens and make the keystone distortion correction, because each keystone distortion correction causes a change in the width of the upper edge, thus burdening the user with complicated operations. However, since the image appears in an upper portion of the displayable area, the image can be displayed at a high position.

Therefore, in regard to the manual adjustment described above, the keystone distortion correction which involves fixing the lower edge is more user-friendly if the operability is given a higher priority. On the other hand, as shown in a projector apparatus disclosed in Japanese Patent Laid-open Publication No. 339671/2001, an automatic angle adjustment has been more generally employed in recent years. The automatic angle adjustment involves detecting a tilt angle of a projector using an acceleration sensor or the like, and automatically making an adjustment based on a keystone distortion correction in accordance with the tilt angle of the projector. The automatic angle adjustment even eliminates a user interface itself.

While there has been developed a projector which has an automatic angle adjusting function and permits the user to select the automatic angle adjustment or manual adjustment, the conventional projector makes only one of the keystone distortion correction which involves fixing the lower edge of an image and the keystone distortion correction which involves fixing the upper edge of the image.

The keystone distortion correction which involves fixing the lower edge of an image cannot take a large projection angle and therefore cannot display the image at a high position on a screen or the like. On the other hand, the manually adjusted keystone distortion correction which involves fixing the upper edge of an image disadvantageously burdens the user with complicated operations. Even a projector which has an automatic angle adjusting function will suffer from a similar disadvantage when the manual adjustment is selected.

Therefore, if the manual adjustment for the keystone distortion correction is selected, the lower edge basis keystone distortion correction should be employed considering the high operability. However, If the automatic angle adjustment is selected, the upper edge basis keystone distortion correction should be employed because of its aptitude for ensuring a large projection angle and the fact that the user interface itself is made unnecessary by the automatic angle adjustment which detects a tilt angle of a projector by an acceleration sensor or the like to automatically make a keystone distortion correction.

SUMMARY OF THE INVENTION

It is therefore an object of the present invention to employ an upper edge basis keystone distortion correction during an automatic adjustment and employ a lower edge basis keystone distortion correction during a manual adjustment.

According to one aspect of the present invention, a projector comprises a correction basis edge switch for selecting either an upper edge or a lower edge of an image as a correction basis edge for a vertical keystone distortion correction, and an image processor for performing the vertical keystone distortion correction with the upper edge or lower edge as the correction basis edge determined in accordance with a selection by the correction basis edge switch.

According to another aspect of the present invention, a projector projects an image obliquely upward to a vertical screen. The projector comprises an auto/manual switch for selecting whether a vertical keystone distortion correction is made automatically or manually, a correction basis edge switch for selecting an upper edge of the image as a correction basis edge for the keystone distortion correction when the auto/manual switch selects an automatic correction, and for selecting a lower edge of the image when the auto/manual switch selects a manual correction, and an image processor for performing the vertical keystone distortion correction with the upper edge or the lower edge as the correction basis edge determined in accordance with a selection by the correction basis edge switch.

Since the projector of the present invention can switch the correction basis edge for a keystone distortion correction between an upper edge basis which fixes the upper edge and a lower edge basis which fixes the lower edge, a selection can be made of a more suitable basis edge.

Further advantageously, the projector of the present invention selects a lower edge basis keystone distortion correction for a manual adjustment, and an upper edge basis keystone distortion correction for an automatic adjustment, to perform a keystone distortion correction which facilitates the manual adjustment, when it is made, and a keystone distortion correction which can ensure a wider projection angle when an automatic adjustment is performed, thereby performing the keystone distortion correction in the most efficient manner.

The above and other objects, features and advantages of the present invention will become apparent from the following description with reference to the accompanying drawings which illustrate examples of the present invention.

BRIEF DESCRIPTION OF THE DRAWINGS

FIG. 3A illustrates a projected image without keystone distortion correction, FIG. 3B illustrates a projected image when it undergoes the keystone distortion correction in a moderate degree, and FIG. 3C illustrates a projected image when it undergoes the keystone distortion correction in a high degree;

FIG. 5A illustrates a projected image without keystone distortion correction, FIG. 5B illustrates a projected image when it undergoes the keystone distortion correction in a moderate degree, and FIG. 5C illustrates a projected image when it undergoes the keystone distortion correction in a high degree;

DESCRIPTION OF THE PREFERRED EMBODIMENTS

Figure 7:
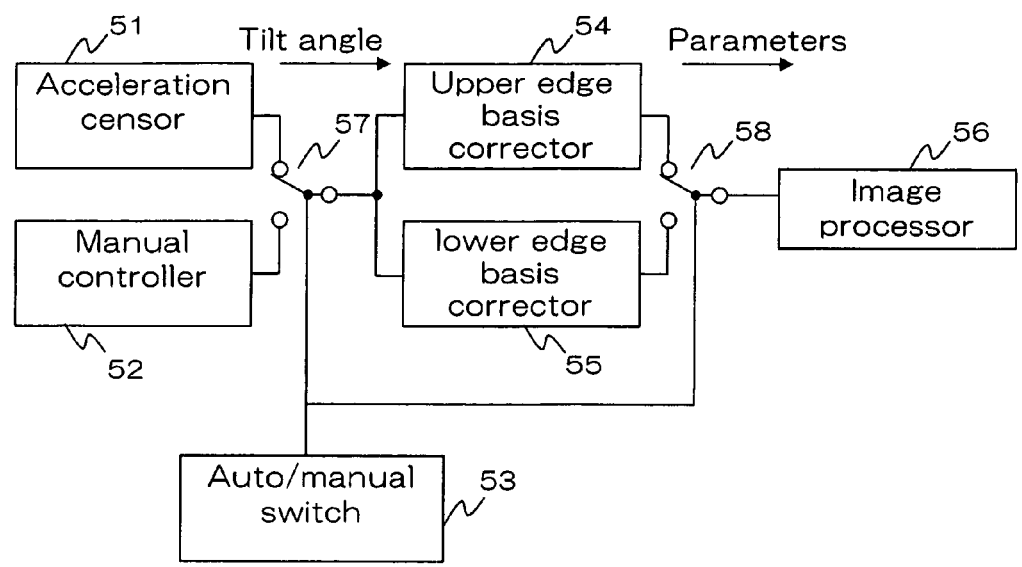
FIG. 7 is a block diagram illustrating the configuration of a projector according to one embodiment of the present invention.

Referring to FIG. 7, a projector according to one embodiment of the present invention will be described with regard to the configuration. In the projector of this embodiment, an image displayed on a liquid crystal panel or the like is projected through a projection lens obliquely upward onto an upright screen. It should be noted that the liquid screen panel, the projection lens, and the screen are omitted in FIG. 7.

The projector comprises acceleration sensor 51 for detecting a tilt angle of the projector, i.e., a tilt angle of the optical axis of the projection lens to a horizontal plane; manual controller 52 for manually setting the amount of correction for a keystone distortion correction with OSD (On Screen Display); auto/manual switch 53 for setting whether an adjustment is made automatically or manually for a keystone distortion correction; upper edge basis corrector 54 for determining parameters, such as a compression ratio, of an image on each scanning line of the liquid crystal panel for an upper edge basis keystone distortion correction; lower edge basis corrector 55 for determining parameters for a lower edge basis keystone distortion correction; and an image processor 56 for processing an image signal with correction parameters applied from upper edge basis corrector 54 or lower edge basis corrector 55 to correct the image for keystone distortion on the lower edge basis or upper edge basis to display the processed image on the liquid crystal panel.

Auto/manual switch 53 is responsive, for example, to a selection of an operator applied to OSD to determine whether a keystone distortion correction is made with automatic adjustment or manual adjustment.

When automatic adjustment is selected in auto/manual switch 53, acceleration sensor 51 is connected to upper edge basis corrector 54 and lower edge basis corrector 55 through first switch circuit 57, and upper edge basis corrector 54 is connected to image processor 56 through second switch circuit 58.

In this event, the operator first sets the orientation of the projector, and projects an image onto the screen through the projection lens. Next, acceleration sensor 51 detects a tilt angle of the projector, upper edge basis corrector 54 automatically determines parameters based on the detected tilt angle, and image processor 56 corrects the image for keystone distortion based on the parameters, with the upper edge of the image being fixed, to project the resulting image which represents a rectangle.

Therefore, the operator is only required to adjust the tilt angle of the projector and a zooming function of the projection lens such that the upper edge of the projected image appears at a target position and has a target width. The operator can readily display a projected image of a rectangular on the screen such that an projection angle increases in accordance with the particular situation, including the screen and the like, without performing an adjustment for the keystone distortion correction.

When manual adjustment is selected by auto/manual switch 53, manual controller 52 is connected to upper edge basis corrector 54 and lower edge basis corrector 55 through first switch circuit 57, and lower edge basis corrector 55 is connected to image processor 56 through second switch circuit 58.

In this event, as the operator sets the projector in an obliquely upward inclination, and projects an image onto the screen through the projection lens, a keystone-distorted image is projected onto the screen. Next, the operator enters a correction amount for a keystone distortion correction from manual controller 52. Lower edge basis corrector 55 determines parameters in accordance with this correction amount, and image processor 56 corrects the image for keystone distortion, with the lower edge of the image being fixed, to project the resulting image representative of a rectangle onto the screen.

Thus, the operator performs an adjustment for the keystone distortion correction to eliminate the keystone distortion by adjusting the tilt angle of the projector and the zooming function of the projection lens, while viewing the image projected onto the screen, such that the lower edge of the projected image appears at a target position and has a target width. However, since the lower edge of the image does not change in position and width during the keystone distortion correction, the operator can readily reproduce a projected image of rectangle, the lower edge of which appears at a target position and has a target width.

In this way, when the automatic adjustment is selected, the projector performs the upper edge basis keystone distortion correction which facilitates the attainment of a large projection angle. On the other hand, when the manual adjustment is selected, the projector performs the lower edge basis keystone distortion correction which only requires easy operations.

Manual controller 52 is not limited to an entry through OSD, but may receive an entry from a keyboard or the like. Also, manual controller 52 may be mounted in the projector body or in a remote control device for wireless communication with the projector body. The same applies to auto/manual switch 53 as well.

A device on which image processor 56 displays an image is not limited to a liquid crystal panel, but a variety of image display devices can be used instead.

Figure 1:
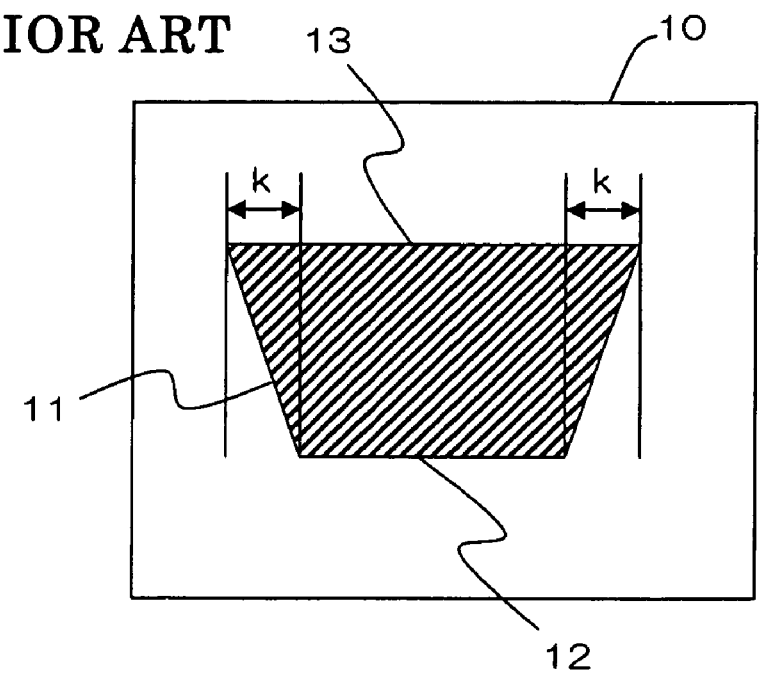
FIG. 1 is a diagram showing an example of a projected image which suffers from a keystone distortion when no correction is made for keystone distortion by a projector.
Figure 2:
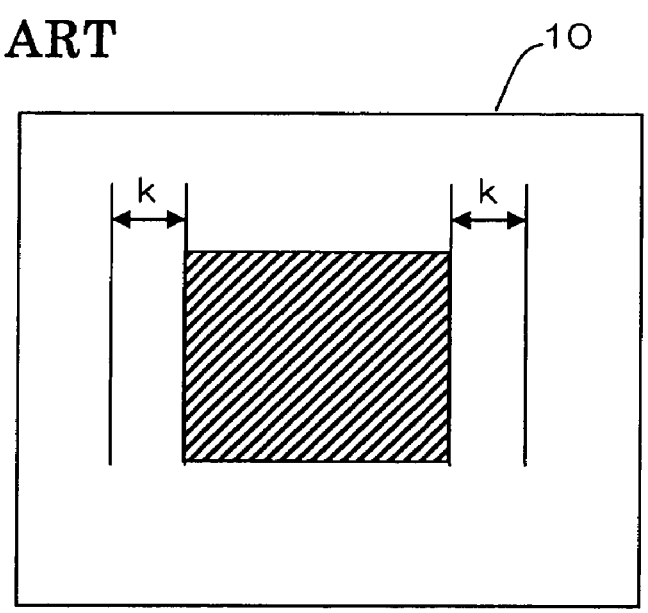
FIG. 2 is a diagram illustrating a projected image when the image shown in FIG. 1 is corrected for keystone distortion.
Figure 3A:
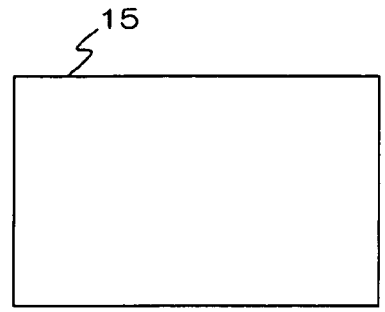
FIGS. 3A to 3C are diagrams showing changes in an image on a liquid crystal panel resulting from a keystone distortion correction which is made with the lower edge being fixed, when the image is projected onto an upright screen from a projector which is installed obliquely upward to the screen, where
Figure 3B:
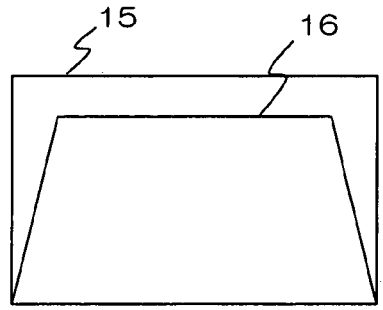
Figure 3C:
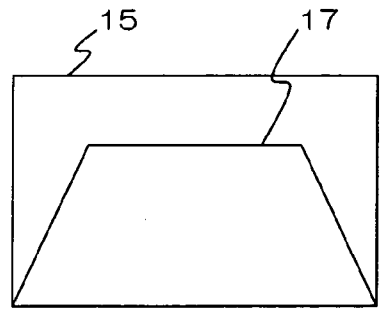
Figure 4:
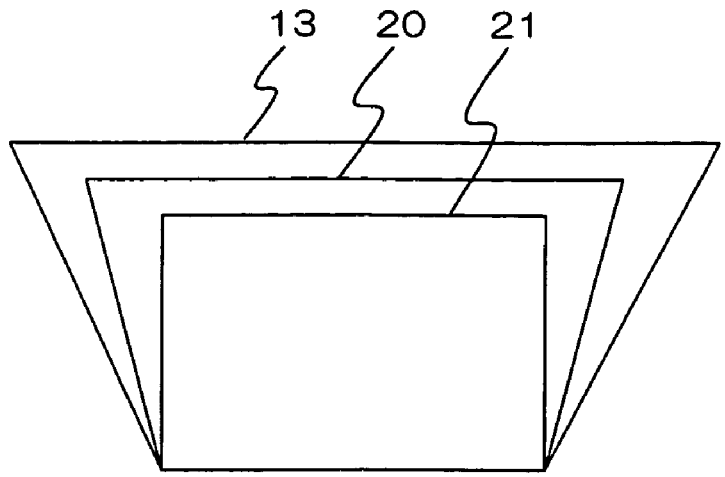
FIG. 4 is a diagram showing changes in an image on a screen resulting from a lower edge basis keystone distortion correction which is made with the lower edge being fixed when the image is projected onto an upright screen from a projector which is installed obliquely upward to the screen.
Figure 6:
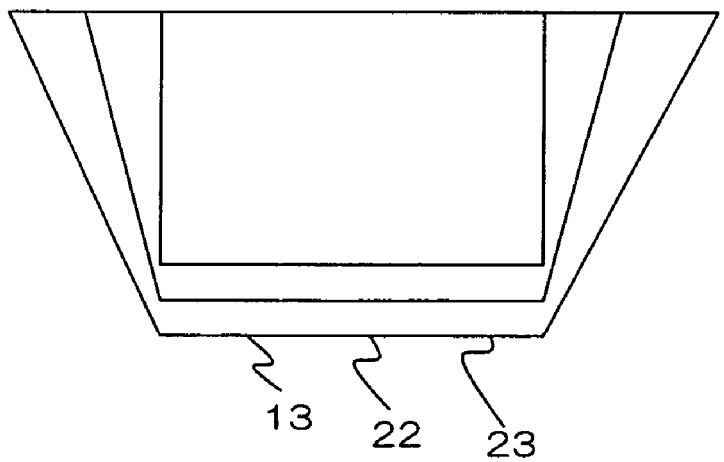
FIG. 6 is a diagram showing a change in an image on a screen resulting from an upper edge basis keystone distortion correction which is made with the upper edge being fixed when the image is projected onto an upright screen from a projector which is installed obliquely upward to the screen.
Figure 5A:
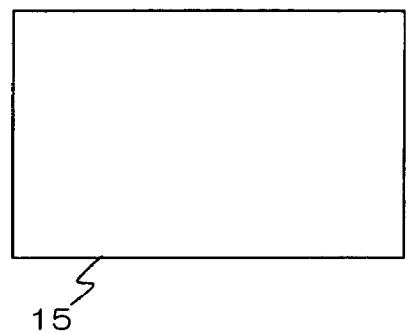
FIGS. 5A to 5C are diagrams showing changes in an image on a liquid crystal panel resulting from a keystone distortion correction which is made with the upper edge being fixed when the image is projected onto an upright screen from a projector which is installed obliquely upward to the screen, where
Figure 5B:
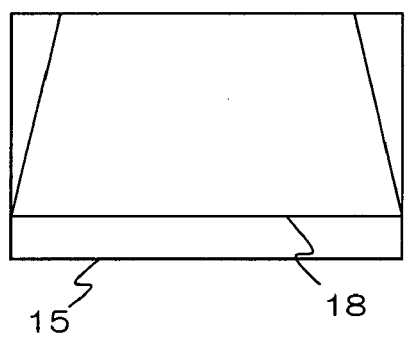
Figure 5C:
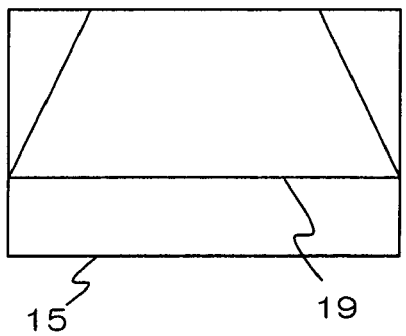

While the foregoing embodiment has been described for the keystone distortion correction which is applied when an image is projected obliquely upward, the present invention can also be applied to a keystone distortion correction when an image is projected onto a vertical screen obliquely downward from a projector installed on a ceiling or the like. In this event, the projected image appears as a trapezoid which has a longer lower edge, as opposed to the trapezoids shown in FIGS. 4 and 6 which have a longer upper edge. Therefore, the manual adjustment is more readily made for a keystone distortion correction which involves fixing the upper edge that is a shorter edge. While a keystone distortion correction which involves fixing the lower edge can take a larger projection angle, a manual keystone distortion correction is complicated. Therefore, the automatic angle adjustment is preferable when the lower edge basis keystone distortion correction is made for increasing the projection angle.

The present invention can also be applied to a projector which projects an image horizontally inclined to a screen, not limited to the vertically inclined projection. In this event, a projected image appears as rotated trapezoid shown in FIG. 4 or 6 by 90 degrees. Therefore, the manual adjustment is more appropriate to a keystone distortion correction which involves fixing an edge that is a shorter edge of a projected image closer to the projector. In a keystone distortion correction which involves fixing an edge that is a longer edge of a projected image further away from the projector, a large projection angle can be ensured, whereas manual keystone distortion correction is complicated.

When the projector is inclined either in the vertical direction or in the horizontal direction, it is preferable to select a shorter edge of a projected image as the basis when a keystone distortion correction is made with a manual adjustment, and to select a longer edge of a projected image as the basis when a keystone distortion correction is made with an automatic adjustment.

Since the acceleration sensor cannot detect the angle by which the projector inclines with respect to the screen in the horizontal direction, an optical sensor or the like must be used for detecting the angle. However, in any keystone distortion correction made for a projector inclined either in the vertical direction or in the horizontal direction, a variety of angle sensors capable of detecting an angle can be used without limiting to the acceleration sensor and optical sensor.

The present invention can further be applied to a keystone distortion correction when the projector is inclined with respect to the screen both in the vertical direction and in the horizontal direction.

Also, in FIG. 7, each of upper edge basis corrector 54 and lower edge basis corrector 55 may use any of the angle detected by acceleration sensor 51 and a correction amount set by manual controller 52 independent of each other to determine its own correction parameters, and second switch circuit 58 may be modified to perform a switching operation independently of auto/manual switch 53. With this configuration, a selection can be made between the upper edge basis or longer edge basis keystone distortion correction or the lower edge basis or shorter edge basis keystone distortion correction by an arbitrary selection of the operator, irrespective of the automatic or manual adjustment.

Although a certain preferred embodiment of the present invention has been shown and described in detail, it should be understood that various changes and modifications may be made without departing from the spirit or scope of the appended claims.

What is claimed is:

1. A projector for projecting an image obliquely upward to a vertical screen, comprising:
   an auto/manual switch for selecting whether a vertical keystone distortion correction is made automatically or manually;
   a correction basis edge switch for selecting an upper edge of the image as a correction basis edge for the keystone distortion correction when said auto/manual switch selects an automatic correction, and for selecting a lower edge of the image when said auto/manual switch selects a manual correction; and an image processor for performing the vertical keystone distortion correction with the upper edge or lower edge as the correction basis edge determined in accordance with a selection by said correction basis edge switch.

2. A projector comprising:
   a display device; a projection lens for projecting an image displayed on said display device obliquely upward to a vertical screen; an acceleration sensor for detecting a tilt angle of an optical axis of said projection lens to a horizontal plane; a manual controller for manually setting a correction amount for a keystone distortion correction; an auto/manual switch for setting whether an adjustment associated with the keystone distortion correction is made automatically or manually; an upper edge basis corrector for determining parameters for the keystone distortion correction on a basis of the upper edge of the image in accordance with the tilt angle detected by said acceleration sensor; a lower edge basis corrector for determining parameters for a keystone distortion correction on a basis of the lower edge of the image in accordance with the correction amount set by said manual controller; an image processor for processing an image signal with the parameters applied thereto from said upper edge basis corrector or said lower edge basis corrector, performing the keystone distortion correction on the image on the basis of the upper edge or the lower edge, and displaying a corrected image on said display device; a first switch circuit for connecting said acceleration sensor to said upper edge basis corrector when said auto/manual switch selects an automatic correction, and for connecting said manual controller to said lower edge basis corrector when said auto/manual switch selects a manual correction; and a second switch circuit for connecting said upper edge basis corrector to said image processor when said auto/manual switch selects the automatic correction, and for connecting said lower edge basis corrector to said image processor when said auto/manual switch selects the manual correction.

3. A projector comprising:
   an auto/manual switch for selecting whether a keystone distortion correction is made automatically or manually; a correction basis edge switch for selecting a longer edge of an image as a correction basis edge for the keystone distortion correction when said auto/manual switch selects an automatic correction, and for selecting a shorter edge of the image when said auto/manual switch selects a manual correction; and an image processor for performing the keystone distortion correction on the image with the longer edge or the shorter edge as the correction basis edge determined in accordance with a selection by said correction basis edge switch.

4. A projector comprising:
   a display device; a projection lens for projecting an image displayed on said display device onto a screen; an angle sensor for detecting a tilt angle of an optical axis of said projection lens to said screen; a manual controller for manually setting a correction amount for a keystone distortion correction; an automatic/manual switch for setting whether an adjustment associated with the keystone distortion correction is made automatically or manually; a longer edge basis corrector for determining parameters for the keystone distortion correction on a basis of the longer edge of the image in accordance with the tilt angle detected by said angle sensor; a shorter edge basis corrector for determining parameters for the keystone distortion correction on a basis of the shorter edge of the image in accordance with the correction amount set by said manual controller; an image processor for processing an image signal with parameters applied thereto from said longer edge basis corrector or said shorter edge basis corrector, performing the keystone distortion correction on the image on the basis of the longer edge or the shorter edge, and displaying the corrected image on said display device; a first switch circuit for connecting said acceleration sensor to said longer edge basis corrector when said auto/manual switch selects an automatic adjustment, and for connecting said manual controller to said shorter edge basis corrector when said auto/manual switch selects a manual adjustment; and a second switch circuit for connecting said longer edge basis corrector to said image processor when said auto/manual switch selects the automatic adjustment, and for connecting said shorter edge basis corrector to said image processor when said auto/manual switch selects the manual adjustment.

5. A method of projecting an image from a projector which projects an image obliquely upward to a vertical screen, said method comprising:
receiving a selection as to whether a keystone distortion correction is made automatically or manually; and performing a vertical keystone distortion correction on the image either using an upper edge of the image as a correction basis edge when an automatic correction is selected or using a lower edge of the image as a correction basis edge when a manual correction is selected.

6. The method of claim 5, wherein the selection is made by an operator.

7. A method of projecting an image from a projector, the method comprising:
receiving a selection as to whether a keystone distortion correction is made automatically or manually, and performing the keystone distortion correction on the image either using an longer edge of the image as a correction basis edge when an automatic correction is selected or using a shorter edge of the image as the correction basis edge when a manual correction is selected.

8. The method of claim 7, wherein the selection is made by an operator.

9. A method of correcting vertical keystone of an image, the method comprising:
selecting an automatic correction or a manual correction of the vertical keystone; and correcting the vertical keystone of the image based on the selected automatic correction or manual correction;
wherein if the automatic correction is selected the vertical keystone is corrected using an upper edge of the image as a correction basis edge, and if the manual correction is selected, the vertical keystone is corrected using a lower edge of the image.

\* \* \* \* \*